Oct. 18, 1949.　　　H. A. STRICKLAND, JR　　　2,484,866
POLYPHASE TRANSFORMER ARRANGEMENT
Original Filed Jan. 25, 1944
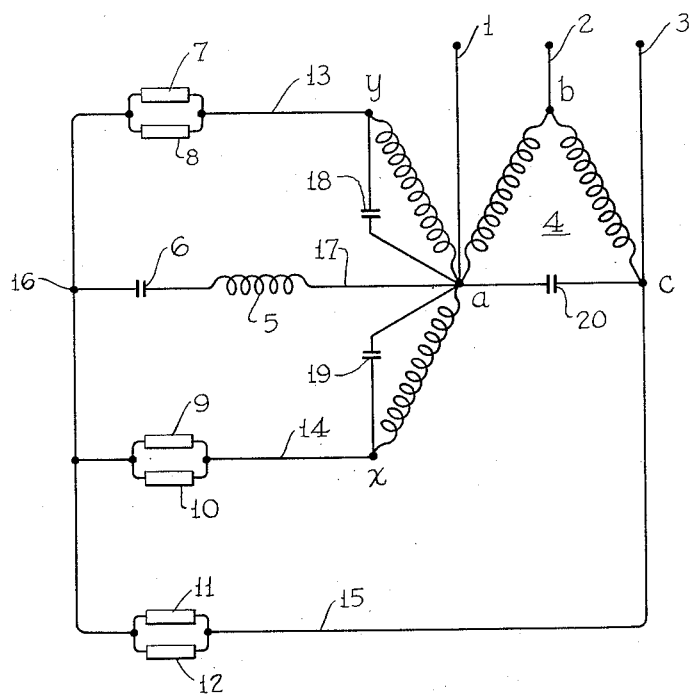
INVENTOR
HAROLD A. STRICKLAND JR.
BY Maurice A. Crews
ATTORNEY Patented Oct. 18, 1949

2,484,866

UNITED STATES PATENT OFFICE 2,484,866

POLYPHASE TRANSFORMER ARRANGEMENT

Harold A. Strickland, Jr., Detroit, Mich., assignor, by mesne assignments, to The Ohio Crankshaft Company, Cleveland, Ohio, a corporation of Ohio Original application January 25, 1944, Serial No. 519,637. Divided and this application November 18, 1946, Serial No. 710,463

4 Claims. (Cl. 171—97)

This invention relates to polyphase transformer systems and this application is a division of my copending application, Serial No. 519,637, filed January 25, 1944, now Patent No. 2,440,309, dated April 27, 1948.

An object of the invention is the provision of circuit means, including transformers, for reducing the number of transformers necessary in the transformation of polyphase current from commercial line sources to a distributing circuit without a reduction in the transferred power.

Other objects pertain to simplicity of arrangement, decrease in weight, with maintenance of efficiency in a polyphase system of transformation.

In the single single figure of the drawing there is shown diagrammatically a circuit indicating the mesh arrangement connecting the power source to the distributing circuit. An actual application of this circuit in induction heating apparatus is shown in my above referred to copending patent, which application should be considered purely from the standpoint of illustrating one embodiment of an application and not as limiting the invention described herein to any one specific application.

In this figure numerals 1, 2 and 3 designate lead-in conductors of a three-phase commercial power system, the voltage value between conductors being assumed for illustrative purposes as 460 volts in a delta connection indicated at 4, a common power arrangement in industrial plants. The delta terminals are designated a, b and c. In order to provide a common return connection for the load 5 with the switch-containing conductors of the three-phase distributing circuit, a Y-connection is made to the delta mesh with the neutral point at a and end points c, x, y, there being a transformer connection in delta branches a—b and b—c only, to form the two Y-arms a—y, a—x, the third arm being delta branch a—c. Capacitors are connected between points a—c, c—x and a—y of the delta mesh. The capacitors mentioned serve as a high-frequency by-pass but are not essential for the effective operation of the transformation.

With the arrangement shown the phase voltage between adjoining Y-conductors is increased over the delta phase voltage alone. This voltage is effective across the load capacitor 6, as shown in the diagram, the capacitor having a series connection to the load 5. The root mean square voltage available for the load circuit is only 460 volts, but if the delta circuit is used with a superimposed Y, as indicated by the adjoining diagram

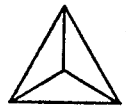

the voltage from the neutral to the delta junction would be $460/\sqrt{3}$. It is, therefore, to get 460 volts and a common phase point that the circuit as described is used. It is, of course, possible to use a conventional transformation, but to do so requires approximately 50% more kilovolt amperes of transformer with proportionately more space required and additional cost.

In utilizing the transformer arrangement as described, one arrangement is shown in the figure wherein opposed rectifying elements 7 and 8, 9 and 10, and 11 and 12 are placed in the distributing conductors 13, 14 and 15 leading from the transformer points y, x and c, respectively. Each group of rectifiers consists of two opposed elements, as, for example, in the Y-circuit rectifier, 7 allowing current conduction in one direction and 8 in the other. As shown in my copending patent, the rectifying elements may be of the type wherein the commencement of the conduction in one direction may be readily controlled. The three conductors 13, 14 and 15 have a common connection at 16 through the common return 17 to the neutral point a of the Y-mesh, this conductor including the capacitor 6 and the load 5. Capacitors 18, 19 and 20 between the transformer points a—y, a—x and a—c are useful to by-pass high-frequency currents. Preferably the capacitance of each of these capacitors should substantially exceed that of the load capacitor 6, a value of four times being found effective. With this arrangement it is possible to transform the polyphase incoming current alternately to each of the three conductors 13, 14 and 15 and secure a current flow through the common return and load 5 in a series of intermittent power pulses. As shown in my above referred to copending patent, alternate power pulses through the load 5 and capacitor 6 are in opposite directions. Thus, one power pulse tends to charge the capacitor through the load positive, while the next succeeding power pulse tends to discharge the capacitor through the load in the negative direction and to then charge it negatively. As the alternate discharges and charges occur, an oscillatory condition is set up in the capacitor 6 and the load coil 5, thereby producing the high-frequency current in the load coil 5 which may be induced into workpieces suitably coupled electrically thereto.

It is pointed out that the transformer ratio is 1 to 1, thus permitting a direct connection to the distributing circuit at conductor 15 from the source conductor 3.

Obviously other types of loads may be employed and minor circuit adjustments may be made in connection with the transformer system, and hence no limitation is implied by the specific showing hereinabove made.

What is claimed is:

1. An electrical power translating circuit comprising three terminals, each terminal being connected to one phase of a three-phase power source, a delta mesh including said terminals, a Y-network having a connection to one of said terminals as a neutral point and having branches electrically related to each branch of said delta mesh, a load including an inductance and capacitance in series relationship, and connections from said neutral point and the free ends of said Y-network to said load.

2. An electrical power translating circuit comprising three terminals, each terminal being connected to one phase of a three-phase power source, a delta mesh including said terminals, a Y-network having connection to one of said terminals as a neutral point and having branches electrically related to each branch of said delta mesh, two of said branch relationships being inductive and all three branches including a capacitor connected in parallel, a load including an inductance and capacitance in series relationship and connections from said neutral point and the free ends of said Y-network to said load.

3. An electrical supply system comprising a three-phase power source having three terminals, a load circuit including an inductor and capacitor, and a translating network between said source and load comprising a delta mesh connection between said terminals, two branches of which each includes a primary of a transformer, and the third of which is transformer-free, a Y-network connected to said delta mesh comprising three branches each connected at one end to one end of the transformer-free branch of said delta mesh to form a neutral point, one branch of said Y-network including the transformer-free delta branch, and each of the other Y-network branches including a secondary of said delta mesh transformers, said load circuit being connected between said neutral point and the free ends of the Y-branches.

4. An electrical power supply system comprising a three-phase power source having three terminals, a load circuit including an inductor and capacitor, and a translating network between said source and load comprising a delta mesh connection between said terminals, two branches of which each includes a primary of a transformer and the other of which is transformer-free, a Y-network connected to said delta mesh comprising three branches each connected at one end to one end of the transformer-free branch of said delta mesh to form a neutral point, one branch of said Y-network including the transformer-free delta branch and each of the other Y-network branches including a secondary of one of said delta mesh transformers having a 1 to 1 turn ratio to the primary thereof, said load circuit being connected between said neutral point and the free ends of the Y-branches.

HAROLD A. STRICKLAND, Jr.

No references cited.